United States Patent [19]
Nilsson et al.

[11] Patent Number: 5,121,458
[45] Date of Patent: Jun. 9, 1992

[54] PRETERMINATED FIBER OPTIC CABLE

[75] Inventors: Richard C. Nilsson; John C. Nelson, both of Hickory, N.C.

[73] Assignee: Alcatel NA Cable Systems, Inc., Claremont, N.C.

[21] Appl. No.: 681,156

[22] Filed: Apr. 5, 1991

[51] Int. Cl.5 .............................. G02B 1/10; G02B 6/26
[52] U.S. Cl. ...................................... 385/100; 385/135
[58] Field of Search ............................... 385/100-105, 385/135

[56] References Cited

U.S. PATENT DOCUMENTS

| | | | |
|---|---|---|---|
| 4,779,951 | 10/1988 | Bouvard et al. | 385/135 |
| 4,795,230 | 1/1989 | Garcia et al. | 385/135 X |
| 4,799,757 | 1/1989 | Gioetter | 385/135 |
| 4,909,591 | 3/1990 | Capol | 385/100 |
| 5,037,177 | 8/1991 | Brown et al. | 385/100 |
| 5,050,945 | 9/1991 | Sorensen | 385/135 X |

Primary Examiner—Akm E. Ullah
Attorney, Agent, or Firm—Ware, Fressola, Van Der Sluys & Adolphson

[57] ABSTRACT

A predetermined optical fiber cable has a main trunk cable comprising a plurality of optical fibers disposed therein and multiple drop cables spliced to the trunk cable at various branch points, the preterminated fiber optic cable being completely assembled at the time of manufacture and is easily installed thereafter. At each branch point an optical fiber cable splice closure is utilized for protecting the optical fibers and splices from moisture and mechanical damage, providing a strong anchoring point for the optical fiber drop cable, and insuring that the minimum fiber bend radius is not violated. The splice closure is cylindrical in shape and has a cavity providing room for the splices and for excess optical fiber storage. Because the splice closure is relatively small (an outer diameter of no greater than 4 inches and a length of no greater than 7 inches), the preterminated fiber optic cable, after manufacture, may be wound in reels for installment without incurring cable or fiber damage and, further, may be deployed within standard PVC piping having a 4 inch inner diameter. The preterminated fiber optic cable may also be preconnectorized.

66 Claims, 2 Drawing Sheets

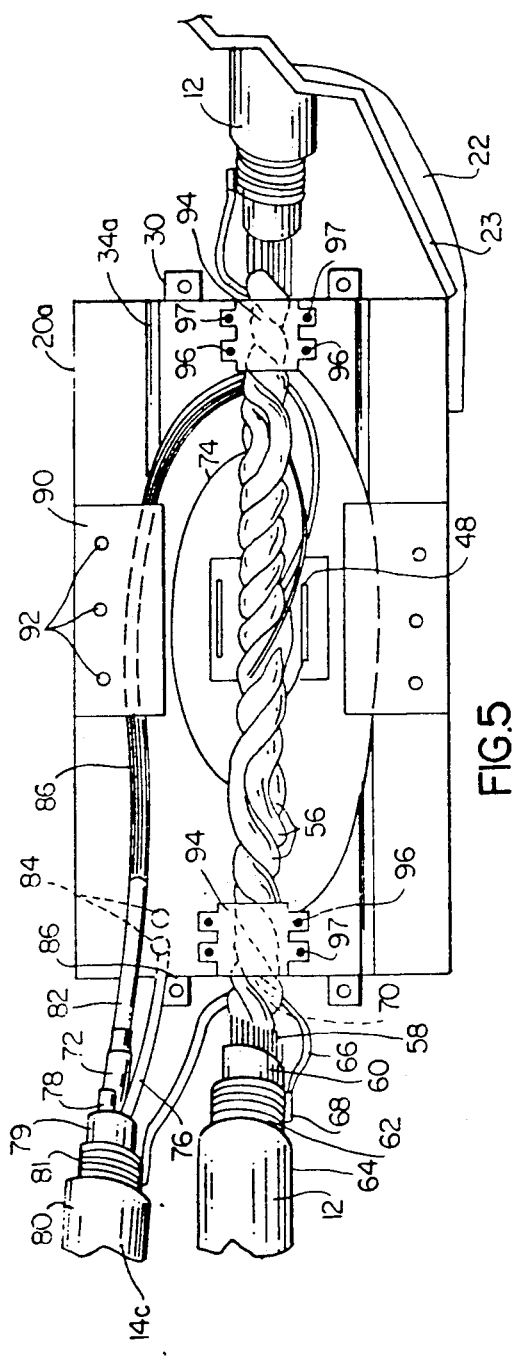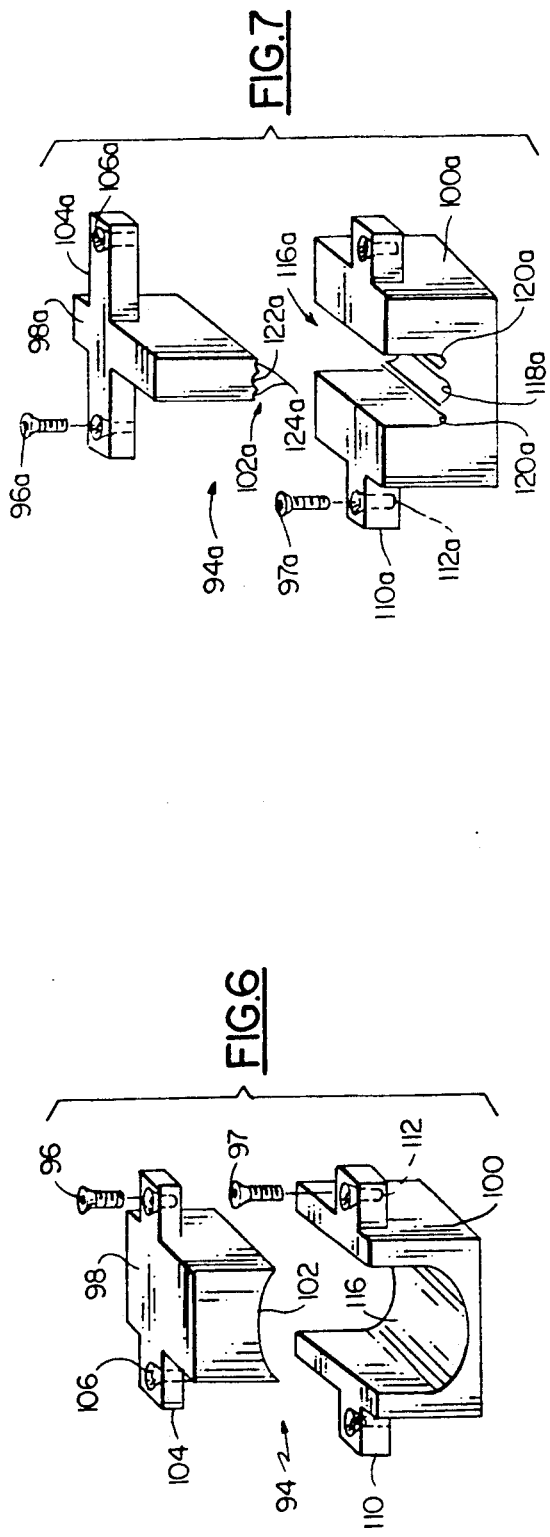

PRETERMINATED FIBER OPTIC CABLE

CROSS REFERENCE TO RELATED APPLICATIONS

This application is related to a patent application of Edmundson entitled FIBER OPTIC CABLE HAVING SPLICELESS FIBER BRANCH AND METHOD OF MAKING filed on even date herewith.

BACKGROUND OF THE INVENTION

1. Field of the Invention

The present invention relates generally to the field of optical fiber cables and more particularly to a preterminated optical fiber cable having at least one drop cable extending therefrom.

2. Description of the Prior Art

With the advent of local area networks and the relative broadband capabilities of fiber optic links, it has become commonplace for new communication systems to include fiber optic capabilities. In the use of optical fibers, optical fiber cables are provided for physical protection of the fibers in view of the fragile nature of the glass optical fibers. A main, or trunk cable, having a predetermined number of optical fibers, is normally used between two termination points in a communication system. At a point where a connection must be made to local homes or buildings, a splice is made to one or more optical fibers in the trunk cable for connecting a separate smaller sized cable, or drop cable. The drop cable is a small flexible cable and is separately routed to the local home or building.

In those systems in which drop cables are required to be spliced to the trunk cable, the required splice must be made on site. This is a very difficult and time-consuming procedure which entails accessing the cable, carefully opening the outer sheath, radial strength yarns, buffer tubes, etc., for accessing the specified optical fibers, splicing the specified optical fibers to the drop cable optical fibers, and sealing the spliced point. Additionally, the technician making the splice may be faced with such adverse working conditions as extreme weather or inconvenient cable placement.

The splice, or branch point of the optical fiber cable must have a number of features First, it must protect the optical fibers and splices from moisture and mechanical damage and provide an adequately strong anchoring point for the drop cable. It also must insure that the electrical continuity of every metallic cable component is maintained and insure that the minimum optical fiber bend radius is not violated. The branch point should also be re-enterable for future optical fiber branching. Thus, to provide a cable with these features, a splice closure is used.

Conventional splice closures are normally comprised of metal or plastic and are utilized to enclose the splice thereby protecting the optical fibers and splices from environmental damage. The splice closures provide a strong anchoring point for the drop cables so that if tensile forces are applied to the drop cables, the splices will not be affected. In addition, the splice closure comprises a large cavity therein for providing space for making the splices and for providing slack buffer tube and optical fiber storage space.

Conventional splice closures are either the "butt-end-type" or the "through-put-type" splice closure. Alternatively, the splice closure may be a composite of the two types being adaptable for either splice method.

The butt-end-type splice closure is configured so that the trunk cable enters and exits the splice closure from the same end. In contrast, the through-put-type splice closures are configured so that the trunk cable enters the closure at one end and exits at the other.

In both types of splice closures, however, the manner in which the splice is made is substantially the same. Within the splice closure, the buffer tubes of the trunk cable are accessed and are coiled a number of times so that an adequate amount of optical fiber is available for splicing. A portion of the buffer tube(s) encompassing the specified optical fibers is removed (approximately 24 inches) so that the specified optical fibers may be cut and prepared for splicing with the corresponding drop cable optical fibers. Although not all of the 24 inches of optical fiber is required for the splice, the slack optical fiber is desired so that splices may be redone if necessary or if future optical fiber branching is desired.

In a similar manner, the drop cable (or cables), is prepared for splicing with the specified trunk cable optical fibers. After the splice is made using well-known splicing methods, the splice is held in a splice tray which is mounted within the splice closure cavity. The splice tray prevents a splice from moving about within the closure upon closure movement. The splice closure is assembled by placing the coiled buffer tubes and slack optical fibers within the cavity and enclosing the cavity so that the splice is completely encapsulated.

Because the conventional splice closure must house the slack buffer tubes and optical fibers without violating the minimum bend radius of the optical fibers, the splice closure cavity must be somewhat large to provide adequate space for storage and splicing purposes. Ultimately, this results in a splice closure which is large and bulky, thus making it impractical for all other uses except for on-site optical fiber splicing.

For example, in those systems in which the cable route architecture has been determined, preterminated cables utilizing copper conductors or the like have been designed and utilized. A preterminated cable comprises a main trunk cable and several drop cables spliced to the trunk cable at various specified points, or branch points during the initial manufacture of the cable. The drop cables, which are usually less than 100 feet in length, may then be connected to the specified termination points upon cable installation. This facilitates the installation of cable thereby minimizing the time and cost. The drop cables may also be preconnectorized, or be assembled with the appropriate connectors at the time of manufacture, for easier and faster installation.

But, in the past, preterminated optical fiber cables have not been manufactured or utilized because of the simple reason that conventional optical fiber splice closures are large and bulky thereby making them impractical. Because the optical fiber trunk cable may be several thousand feet in length, it is normally wound in reels upon manufacture so that it may be stored for subsequent deployment. The conventional splice closure makes a preterminated optical fiber cable quite impractical and unwieldy to be installed in this manner. In addition, an optical fiber cable utilizing conventional splice closures may not be placed on small cable reels for deployment without incurring cable or fiber damage.

Furthermore, in many applications, it is desirable that the optical fiber cable be disposed within polyvinyl chloride (PVC) piping for additional environmental and rodent protection or pulled through such piping to conveniently pass under roads, driveways, etc. Because standard PVC piping has a four-inch inner diameter, it is impossible to install a preterminated optical fiber cable utilizing the conventional splice closure. In such a situation, the only manner of providing drop cable access to the trunk cable using the conventional splice closure is by making the splice after the trunk cable is deployed. Thus, providing a preterminated optical fiber cable having drop cables spliced thereto while maintaining optical fiber protection and minimal overall cable size is a difficult problem which had not been previously resolved.

Even with the current level of understanding of the conflicting needs associated with optical fiber cables, there has not previously been a practical preterminated optical fiber cable having multiple optical taps at a single branch point although such a cable is desirable.

SUMMARY OF THE INVENTION

The present invention relates to a preterminated fiber optic cable having drop cables spliced at distinct branch points along the trunk cable at time of manufacture or some other time before, during, or after installation and can be easily assembled and installed. The invention additionally relates to the method of manufacturing preterminated optical fiber cables and to a splice closure utilized therewith.

It is an object of the present invention to provide a preterminated optical fiber cable having multiple drop cables spliced thereto which may be completely assembled at time of manufacture or sometime before or during installation and easily installed thereafter.

It is another object of the invention to provide a preterminated fiber optic cable having multiple drop cables from the trunk cable which can be disposed in or pulled through standard PVC piping.

It is a further object of the invention to provide a method of making a preterminated fiber optic cable having multiple drop cables from a single branch point while maintaining optical fiber protection and minimal cable size.

It is yet another object of the invention to provide an optical fiber cable splice closure for protecting the optical fibers and splices from moisture and mechanical damage while having minimal size.

It is still another object of the invention to provide an optical fiber cable splice closure which allows a plurality of drop cable splices, insures that the minimum bend radius of the optical fiber is not violated, insures electrical continuity of every metallic cable component, and maintains a cable outer diameter of less than four inches.

These and other objects of the invention, which will become evident upon reading of the present description of the invention, are provided by a preterminated optical fiber cable constructed according to the invention having a main trunk cable and a plurality of drop cables spliced at various branch points along the length of the trunk cable. At each branch point, an optical fiber cable splice closure is utilized for protecting the optical fibers and splices from moisture and mechanical damage, providing a strong anchoring point for the optical fiber drop cable, and insuring that the minimum fiber bend radius is not violated. A heat-shrinkable branch point covering is applied over the splice closure to provide additional environmental protection to the optical fibers and splices.

The drop cables, which have typically less than six optical fibers and are usually less than 100 feet in length, may have connectors preinstalled for easy and fast installation. Further, the drop cables are typically strapped to the trunk cable until deployment.

The optical fiber cable splice closure comprises two substantially symmetrical halves held together by screws. The splice closure is cylindrical in shape and has a cavity providing room for the splices and for excess optical fiber storage. The splice closure has a relatively small outer diameter (no greater than 4 inches) and is short in length (approximately 7 inches). The splice closure has a plurality of openings through which the optical fibers of the trunk and drop cables may enter and exit the splice closure. The splice closure also has a multiple of different clamps which are selectively inserted in the closure so that the closure may be adaptably utilized with the various types of optical fiber cables, i.e., loose tube design, tight buffered design, monotube design, etc. The splice closure further has securing tabs for providing adequately strong anchoring points for the optical fiber drop cables and the trunk cable. The splice closure may be comprised of a metal or a metal and a plastic so that electrical continuity may be maintained throughout the optical fiber cable. The splice closure may be utilized in the manufacture of preterminated optical fiber cables or it may be used to add drop cables to pre-existing, preinstalled optical fiber cables.

BRIEF DESCRIPTION OF THE DRAWINGS

FIG. 5 is a top view of the bottom closure half of the splice closure of the present invention shown partially assembled.

FIG. 6 is an exploded perspective view of a trunk cable anchoring clamp utilized with the splice closure of the present invention.

FIG. 7 is an exploded perspective view of a second embodiment of the trunk cable anchoring clamp utilized with the splice closure of the present invention.

DETAILED DESCRIPTION OF THE INVENTION

Figure 1:
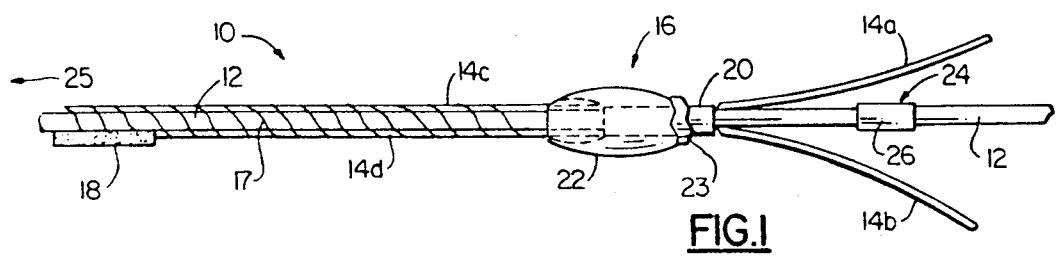
FIG. 1 is a broken side elevational view showing the preterminated optical fiber cable of the present invention.

In those fiber optic communication systems in which the cable route architecture has been determined prior to the installation of the optical fiber cables, the preterminated optical fiber cable of the present invention may be designed and utilized. The preterminated optical fiber cable comprises a main "trunk" cable and several "drop" cables spliced to the trunk cable at various specified "branch" points during the initial manufacture of the cable. Alternatively, the drop cables can be spliced to the trunk cable at any time before, during, or after installation of the trunk cable. Referring to FIG. 1, there is shown a preterminated optical fiber cable of the present invention indicated generally by the numeral 10 which includes a trunk cable 12 and four separate smaller-sized drop cables 14a, 14b, 14c, and 14d spliced to the trunk cable at a branch point 16. The trunk cable is utilized to extend between two termination points in the communication system while the drop cables are utilized where a connection must be made from the trunk cable to an additional termination point, such as to a local home or building.

The drop cables, which have typically less than six optical fibers and are usually less than 100 feet in length, are typically strapped to the trunk cable with cable lashing 17 until deployment is required. Further, any or all of the drop cables may be "preconnectorized", or assembled with the appropriate connectors at the time of manufacture, for easy and fast installation. Cable 10 has a single preconnectorized drop cable 14d having connector 18 assembled to the drop cable at the time of manufacture and has two strapped drop cables 14c and 14d.

The drop cables each have at least one optical fiber which is spliced with a specified optical fiber in the trunk cable at the branch point. The splices are encapsulated by a splice closure 20, shown in FIG. 2, which protects the optical fibers and splices from moisture and mechanical damage. The optical fibers and splices are further protected from moisture by a branch covering 22. The branch covering is formed of a material generally known as heat-recoverable material which is well known in the art and is formed into heat-recoverable sleeves, tubes and tapes. Disposed between the branch covering and the splice closure is a nonadhesive wrap 23 so that the splice closure can be re-entered easily after assembly if necessary.

When making a splice with the trunk cable, the specified optical fiber must be accessed through the protective elements of the cable, i.e., the outer sheath, metallic armor, buffer tube, etc., at a disconnect point 24. The disconnect point should be approximately 24 inches from the branch point so as to provide an adequate amount of optical fiber for splicing purposes. The specified optical fiber (or fibers) are cut at the disconnect point and the trunk cable opening is repaired using a patch 26, comprised of heat-recoverable material. The selected trunk cable optical fibers are then carefully accessed at the branch point, carefully pulled from within the cable's protective elements so that a portion of the optical fiber (approximately 24 inches long) is disposed outside of the cable at the branch point, and spliced with the appropriate drop cable optical fibers. This will be discussed in greater detail below.

The above described trunk cable may be of any type of optical fiber cable design, i.e., loose tube, tight-buffered, monotube, open-channel, etc. Thus, the preterminated optical fiber cable of the present invention is applicable in the vast majority of optical fiber communication or information systems utilized.

Figure 2:
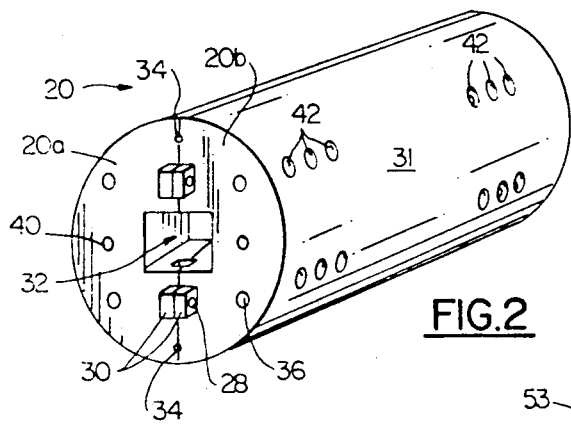
FIG. 2 is a perspective view of the splice closure of the present invention shown assembled without any optical fiber cables extending therethrough.

FIG. 2 illustrates the splice closure of the present invention shown assembled without any optical fiber cables extending therethrough. The splice closure, which is preferably comprised of a metal, such as aluminum, or a metal/plastic combination, comprises two halves 20a and 20b. The two halves are substantially identical in shape and size and are held together by securing screws 28 through securing tabs 30 positioned on both ends of the closure. When the splice closure is assembled, it has the shape of a long, thin cylinder having a length of approximately seven inches and an outer diameter of three and one-half inches. In addition, the closure is partially hollowed out thereby forming a closure cavity shown as 46 in FIG. 3, providing space for the actual splicing of the trunk and drop cable and optical fibers. This will be discussed in greater detail below.

The splice closure further comprises a plurality of openings located on both ends and along the cylindrical wall portion 31 extending into the closure cavity. Each half of the closure has identical and symmetrical openings. Located on each end of the closure is a trunk cable entrance port 32 so that the trunk cable may extend through the closure and two drop cable entrance ports 34 so that the drop cables may enter into the closure cavity where they are spliced with the trunk cable. Although only two drop cable entrance ports on each end of the closure are described, the total number of drop cable entrance ports may vary depending upon the requirements at the branch point.

Each closure end further comprises four drop cable strength member apertures 36 extending into the closure. These apertures allow each drop cable strength member to be secured to the closure. In addition, each closure end has two ground strap set screw holes 40 for securing ground straps from the trunk cable and drop cables to the closure thereby maintaining continuity of the cable conductive elements.

The closure cylindrical wall 31 similarly has a plurality of openings extending into the closure. Two horizontal rows of three set screw holes 42, positioned towards each end of the closure are tapped in the cylindrical wall. These set screw holes allow set screws to be utilized for securing the drop cable strength members to the closure.

Figure 3:
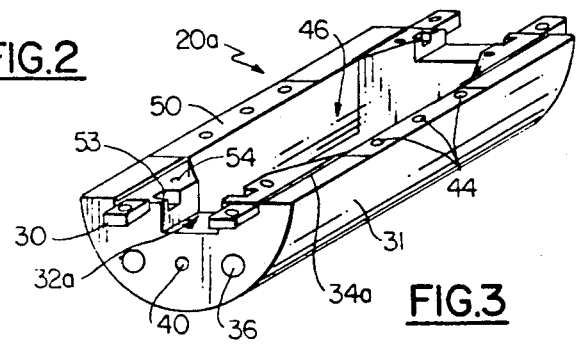
FIG. 3 is a perspective view of the bottom closure half of the splice closure of the present invention.
Figure 4:
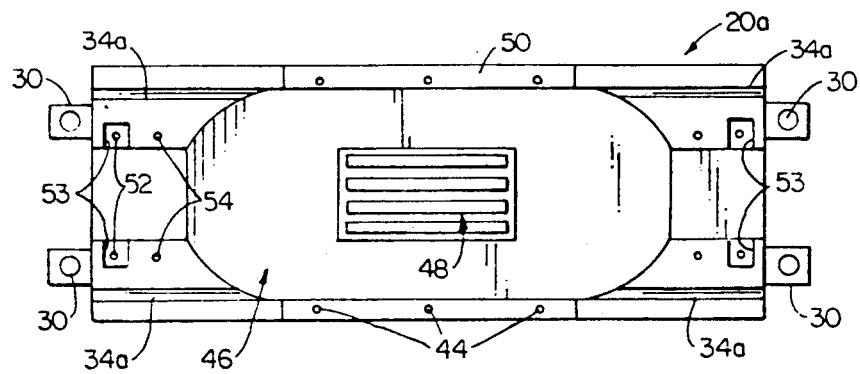
FIG. 4 is a top view of the same bottom closure half of the splice closure of the present invention.

FIG. 3 and FIG. 4 illustrate a representative closure half 20a in a perspective view and a top view, respectively. Closure half 20a will be referred to as the "bottom closure half" because when the optical fiber splice is being made inside the closure, the bottom closure half is positioned on the work surface, the top closure half being subsequently assembled on top of the bottom closure half. The remaining "top" closure half 20b is substantially identical to bottom closure half 20a. As was discussed above, each closure half is semi-cylindrical in shape having two securing tabs 30 extending outwardly from each end. The bottom securing tabs are utilized with the corresponding securing tabs of the remaining closure half for keeping the two halves in juxtaposition. The closure half further comprises a closure cavity 46 located in the center of the closure half. Although the exact dimensions of the closure cavity are not critical, the cavity must have sufficient room for the storage of the spliced optical fibers and, therefore, may vary depending upon requirements of the particular branch point.

Extending inwardly from each end of the bottom closure half towards the cavity are two semi-cylindrical shaped drop cable entrance channels 34a and a trunk cable entrance channel 32a. The top closure half has corresponding entrance channels which, when the splice closure is assembled, form the above-described trunk and drop cable entrance ports 32, 34.

The trunk cable entrance channel has a rectangular shape extending from each end to the cavity of the closure. It is dimensioned to receive a trunk cable anchoring clamp, elements 94, 94a in FIGS. 6 and 7, respectively, which is utilized to clamp the trunk cable to the closure at each end so that the portion of the trunk cable within the closure will not be subject to any external forces, i.e., tension, compression, etc. Each entrance channel further comprises two clamp retaining tab apertures 53 disposed on either side of the entrance channel. Securing screw holes 52 and 54 are tapped into the bottom closure half for securing the clamp to the closure. This can be clearly seen in FIG. 4.

Inside the closure cavity, at least one closure half further comprises a splice holder 48 used for holding the splice thereby preventing any unwanted movement by the splice. The splice holder is milled out of the bottom closure half to reduce the overall area required. The splice is secured to the splice holder using well known techniques.

Located along each longitudinal side of the cavity tapped into the closure are three retaining bracket screw holes 44. These screw holes are utilized for mounting a retaining bracket onto the closure. The retaining bracket, shown as element 90 in FIG. 5, is used for preventing the optical fibers from inadvertently moving out of the closure half and being pinched between the closure halves upon assembly. As can be seen, the screw holes are located in a retaining bracket recess 50. The retaining bracket recess is simply an area where the longitudinal side is recessed so that, when the retaining bracket is mounted, it will lie flush with the remainder of the longitudinal side.

Referring now to FIG. 5, therein is illustrated an enlarged view of the branch point, shown partially assembled with bottom closure half 20a, a portion of branch covering 22 and nonadhesive wrap 23 being shown in a cut-away view. In a fully assembled condition, the top closure half would be assembled juxtaposing the bottom closure half 20a and secured in position by securing tabs 30. Further, in a fully assembled condition, the nonadhesive wrap and the heat shrinkable covering would completely encapsulate the branch point.

As can be seen, the trunk cable 12, which is in this case a loose tube design optical fiber cable, comprises a plurality of buffer tubes 56 which encapsulate the optical fibers 74 of the trunk cable. The number of optical fibers disposed in each buffer tube may vary depending upon the requirements of the particular cable. The buffer tubes are disposed above a central strength member (not shown) in either helical or reverse helical fashion. Reverse helically applied radial strength yarns 58 are disposed about buffer tubes for additional strength while retaining flexibility. The radial strength yarns are preferably of a material such as aramid. An inner jacket 60 may then be extruded about the radial strength yarns. Disposed about the inner jacket is an armored jacket 62 for rodent protection. Finally, an outer sheath 64 is extruded to provide an environmental protective layer and to provide a visually attractive cable. A grounding strap 66 is connected, at one end, to the armored jacket with a clamp 68 and, at the other end, to the closure with a set screw 70 to the ground strap set screw hole.

When used with the spliced closure 20, the outer sheath, armored jacket, radial strength yarns, and inner jacket must be removed so that only the buffer tubes and central strength member may be disposed within the closure. These trunk cable components are only removed to the extent necessary for exposing a sufficient length of the buffer tubes to be enclosed within the splice closure. Thus, while the outer protective components of the trunk cable are removed to expose the buffer tubes, buffer tubes extend entirely through the closure The drop cable 14a, in this case, is a unitube optical fiber cable and, therefore, comprises a single buffer tube 72 which encapsulates one or more optical fibers 86. The number of optical fibers disposed in the drop cable buffer tube may vary depending upon the requirements of the particular drop cable. Reverse helically applied radial strength yarns 78 are disposed about the buffer tube for additional strength while retaining flexibility. The radial strength yarns are preferably of a material such as aramid. Extending longitudinally with and disposed on either side of the buffer tube are strength members 76 (only one shown). An inner jacket 79 may then be extruded about the strength members and strength yarns. Disposed about the inner jacket is an armored jacket 81 for rodent protection. Finally, an outer sheath 80 is extruded to provide an environmental protective layer and to provide a visually attractive cable.

Similar to the trunk cable components, the outer sheath, armored jacket, inner jacket, and radial strength yarns of the drop cable must be removed so that the buffer tube is exposed. The buffer tubing is then removed thereby exposing the optical fibers. A transport tube 82, preferably comprised of a material such as nylon or polyester, is placed around the optical fibers for protecting the fibers when external to the closure. The optical fibers are routed into the closure along the drop cable entrance channel, so that they are disposed within the closure cavity. The transport tubing is dimensioned so that it fits snugly within the drop cable entrance channel. If the buffer tube of the drop cable is so dimensioned, the transport tubing is unnecessary. Each of the strength members 76 is routed into the closure through the strength member aperture 36 and is secured in place by set screws 84.

A portion of the appropriate buffer tube 56 of the trunk cable is carefully removed so that a length, approximately 24 inches, of the specified optical fiber 74, which had been previously cut at disconnect point 24 (FIG. 1), may be pulled from within the buffer tube. The specified optical fiber 74 is cut to an appropriate length and spliced to the specified drop cable optical fiber using well known splicing methods. The technician making the splice must be careful to not violate the minimum bend radius of the optical fiber which is normally between one and one and one-half inches. This can be accomplished by looping the specified fibers within the closure cavity so that the minimum bend radius is not violated. Once the splice has been made, the splice is secured, using well known methods, to splice holder 48 so that the splice will not move relative to the closure when the cable is being moved. The closure cavity is dimensioned so that there is sufficient room for at least six such splices and so that the excess optical fiber from both the trunk and drop cables may be stored within the cavity for future use such as for repair or system reconfiguration.

It must be emphasized at this point that this is a very important feature of the present invention. Because the specified trunk cable optical fibers are cut at the disconnect point outside of the splice closure and carefully disposed and stored within the closure, the closure may remain relatively small in size. This is in contrast to the large, bulky conventional splice closures which must be large enough to provide storage area for the slack optical fibers and the coiled buffer tubes.

The present invention can also incorporate a small amount of slack buffer tube storage if required. The buffer tubes would be stored in one half of the cylindrical splice closure, and the splices and excess fiber would be housed in the other half of the cylindrical splice closure. This will limit the number of fibers which can be dropped, but will also allow access to the downstream fiber segment of the trunk cable fiber(s) which is cut and spliced to the drop cable fiber(s). Accessibility of the downstream trunk cable fiber may be useful for future information transport ability from the branch point.

Disposed on each longitudinal side in the retaining bracket recess of the bottom closure half 20a is a retaining bracket 90 which is secured by screws 92 to tapped screw holes in the closure half 20a. The optical fiber retaining bracket is basically a thin, flat plate comprised of either a metal or a plastic, and acts as a ledge extending into the closure cavity over the exposed optical fibers. This prevents the optical fibers from moving out of the closure cavity during assembly and inadvertently being pinched between the two closure halves.

Although FIG. 5 shows a loose tube optical fiber cable disposed in the closure, other types of optical fiber cables may be utilized with the closure as well, with slight variations. For instance, a slotted core optical fiber cable, by definition, does not comprise buffer tubes encompassing the fibers. The slotted core optical fiber, rather, has a slotted core central strength member with helical or contrahelical grooves extending therealong for receiving one or more optical fibers. Therefore, to be utilized with the closure, the cable would need to be stripped of its protective elements only to the extent that a portion of the slotted core central strength member with the fibers disposed in the corresponding slotted core grooves, is disposed within the closure.

The portion of the trunk cable which is disposed within the splice closure, i.e., the disposed buffer tubes, must not be able to move relative to the splice closure after the splice closure has been completely assembled. Anchoring clamps 94, which are secured at each end of the splice closure by screws 96 and 97, clamp the exposed buffer tubes to the closure thereby preventing any relative movement.

Because there are various types of optical fiber cables which may be employed, i.e., loose tube design, monotube design, etc., various types of anchoring clamps may be utilized so that the splice closure is adaptable for each optical fiber cable type. FIGS. 6 and 7 illustrate anchoring clamps 94, 94a for loose tube design and monotube design optical fiber cables, respectively. In FIG. 6, loose tube cable anchoring clamp 94 is illustrated in an exploded perspective view. The anchoring clamp is comprised of a top and bottom portion 98, 100 for being assembled in the trunk cable entrance channels of the top and bottom closure halves. Top clamp portion 98 is substantially rectangular in shape, further having a concave, semi-cylindrical cable press 102 and two retaining tabs 104. The cable press is shaped to correspond with the helically or reverse helically wrapped buffer tubes of the loose tube trunk cable. Similarly, the two retaining tabs are dimensioned for fitting in the corresponding retaining tab apertures of the top closure half. Each tab has a screw hole 106 tapped so that securing screws 96 (one shown) may secure the top clamp portion to the bottom closure half. The screw holes 106 are dimensioned so that the screws may be counter-sunk into the tab.

Similarly, the bottom clamp portion 100 is rectangular in shape with two retaining tabs 110 extending outwardly from its sides. The retaining tabs have screw holes 112 dimensioned so that screws 97 (one shown), which serve to secure the bottom portion to the bottom closure half 20a, may be counter-sunk into the tabs. The retaining tabs are dimensioned for fitting in the corresponding retaining tab apertures of the bottom closure half. The bottom clamp portion further comprises a U-shaped cable holder 116 extending from the front to the back of the bottom clamp portion. The shape of the cable holder 116a corresponds with the shape of the wrapped buffer tubes of the trunk cable. Thus, the cable press of the top portion and the U-shaped cable holder of the bottom portion, when used together, form an aperture which corresponds to the general shape of the wrapped buffer tubes of the loose tube trunk cable.

Referring again to FIG. 5, in operation, a bottom clamp portion 100a is secured at each end of the bottom closure half, with securing screws 94a, the buffer tubes of the trunk cable being disposed in each of the U-shaped holders. After the splice has been made, the top clamp portion is secured to the bottom closure half 20a with securing screws 96, the top and bottom clamp portions compressing the buffer tubes therebetween. The cable press and cable holder are dimensioned and shaped so that there is sufficient compressive force on the buffer tubes so that the tubes cannot move within the closure. The compressive force, however, must not be so great that the optical fibers disposed in the buffer tubes will be damaged. The top closure half is then positioned over the bottom closure half and halves are secured together. It should be noted that, because the retaining tabs of the top clamp portion are offset with respect to the bottom clamp portion retaining tabs, the top closure half must have clamp retaining tab apertures with corresponding positioning.

FIG. 7 illustrates a monotube cable anchoring clamp 94a which can be utilized with the splice closure in place of the loose tube cable anchoring clamp described above. The monotube cable anchoring clamp is configured to clamp a monotube design optical fiber cable within the closure. Similar to the loose tube anchoring clamp 94, the monotube anchoring clamp 94a has a top and bottom portion 98a, 100a for being assembled between the top and bottom closure halves. The bottom clamp portion 100a is substantially rectangular in shape and dimensioned to fit in the trunk cable entrance channel of the bottom closure half 20a. Extending outwardly from its sides are two retaining tabs 110a which, similarly, are dimensioned to fit in their corresponding retaining tab apertures. Screw holes 112a are provided in the tabs for securing the bottom clamp portion to the bottom closure half.

The bottom clamp portion further comprises a monotube cable holder 116a extending from the front to the back of the bottom clamp portion. The monotube cable holder is configured having a center channel 118a for receiving the buffer tube of a monotube design optical fiber cable. Disposed on either side of the center channel is a strength member channel 120a for receiving each of the two strength members of a monotube design optical fiber cable.

The top clamp portion 98a, similarly, is rectangular in shape with two retaining tabs 104a extending outwardly therefrom. The top clamp portion has a cable press 102a dimensioned to fit with monotube cable holder 116a of the bottom clamp portion. The cable press has a center channel 122a and two strength member channels 124a corresponding to those of the bottom clamp portion.

In operation, the monotube optical fiber cable is disposed in holder 116a, the buffer tube being disposed in center channel 118a and each strength member being disposed in strength member channels 120a. When the closure is assembled, the cable press and cable holder center channels are disposed around the monotube buffer tube exerting little to no compressive force thereon. The cable press and cable holder strength member channels, in contrast, are disposed around the monotube cable strength members and exert a substantial amount of compressive force thereon thereby preventing any trunk cable movement within the closure. Again, it should be noted that the top clamp portion retaining tabs are offset from those of the bottom clamp portion and the top closure half must have corresponding aperture positioning.

Other types of cable clamps may be utilized with the splice closure thereby making the splice closure adaptable for most all optical fiber cable designs.

Although it is not shown in the figures, the top closure half may have a splice holder for holding splices of copper conductors or the like. Such a splice closure would allow the splicing and deployment of composite cables thereby making the preterminated optical fiber cable of the present invention adaptable for most all cabling requirements.

Because of its small size, the splice closure of the present invention may be utilized during the initial manufacture of the optical fiber cable. Because the splice closure provides adequate anchoring for the optical fiber splices while retaining its small size, the preterminated optical fiber cable may be placed on small cable reels without incurring cable or fiber damage.

Thus, the preterminated optical fiber cable of the present invention provides an optical fiber cable having a branch point with multiple drop cables spliced thereto while retaining an outer diameter small enough so that the trunk cable may be utilized with standard four inch PVC piping. The splice closure utilized at the branch point provides the optical fibers and splices with protection from mechanical damage while insuring that the minimum bend radius of the optical fiber is not violated. In addition, the splice closure insures electrical continuity of every metallic cable component. It provides an adequately strong anchoring point for the optical fiber drop cable and is re-enterable for future fiber branching.

While the present invention has been described with respect to a particular manner of implementing the invention, it is to be understood that the foregoing description is intended to inform and not to limit. The invention resides in the innovations described herein and in all present and future manners of implementing these innovations. The following claims are to be understood to encompass all manner of practicing the invention which are or which become evident in view of the relevant technology as it exists now and as it develops.

What is claimed is:

1. A preterminated fiber optic cable assembly, comprising:

a trunk cable having a predetermined length and having first and second ends, said trunk cable further having an access point being positioned along the length of said trunk cable, said trunk cable including; optical fiber buffering means having a length substantially equal to said predetermined length and having first and second ends, at least one optical fiber of substantially said predetermined length disposed within and enclosed by said buffering means, said fiber having first and second ends substantially coincident with the first and second ends of said trunk cable, and at least one splicing optical fiber having first and second ends and a first portion extending between its first end being coincident with said trunk cable first end and said access point, said first portion being disposed within and enclosed by said buffering means and a second portion extending from said access point to its second end, said second portion being disposed outside of said buffering means;

at least one drop cable having first and second ends, said drop cable including; jacketing means having first and second ends, said jacketing means first end being substantially coincident with said drop cable first end, and at least one optical fiber having first and second ends substantially coincident with said drop cable first and second ends, said fiber having a first fiber portion extending between its first end and said second end of said jacketing means, said first fiber portion being disposed within and enclosed by said jacketing means, and a second fiber portion extending between said jacketing means second end and the fiber's second end, said second fiber portion being disposed outside of said jacketing means, the fiber's second end being spliced to said splicing optical fiber second end; and a splice closure including; a splice closure body having a cavity dimensioned for encompassing an uncoiled, substantially linear length of said trunk cable extending therethrough, said trunk cable length including at least said access point, and for further encompassing said splicing optical fiber second portion and said splice, and opening means extending into said cavity for receiving said drop cable second fiber portion.

2. A preterminated fiber optic cable assembly as described in claim 1, wherein said splice closure has a cylindrical shape having first and second ends, said splice closure first and second ends each comprising opening means for receiving said trunk cable whereby said uncoiled, substantially linear length of said trunk cable extends between said first and second end receiving means.

3. A preterminated fiber optic cable assembly as described in claim 2, wherein said cylindrical splice closure has an outer diameter of less than 4 inches.

4. A preterminated fiber optic cable assembly as described in claim 2, wherein said cylindrical splice closure has a length of less than 8 inches.

5. A preterminated fiber optic cable assembly as described in claim 2, wherein said drop cable receiving means comprises a plurality of drop cable entrance channels extending between said first and second ends of said cylindrical splice closure and said cavity.

6. A preterminated fiber optic cable assembly as described in claim 1, wherein said drop cable comprises at least one strength member and said splice closure comprises means for securing said strength member to said splice closure.

7. A preterminated fiber optic cable assembly as described in claim 1, wherein said drop cable comprises an armored jacket and said splice closure further comprises a grounding strap having first and second ends, said grounding strap first end being connected to said armored jacket and said grounding strap second end being connected to said splice closure body.

8. A preterminated fiber optic cable assembly as described in claim 1, wherein said trunk cable further comprises a central strength member and further wherein said trunk cable buffering means comprises a plurality of buffer tubes disposed around said central strength member, said buffer tubes encapsulating said optical fibers.

9. A preterminated fiber optic cable assembly as described in claim 2, wherein said splice closure further comprises first and second means secured to said splice closure first and second ends for clamping said trunk cable to said splice closure.

10. A preterminated fiber optic cable assembly as descried in claim 9, wherein said first and second clamping means each comprise first and second halves having means for being secured to said splice closure body and being dimensioned for cooperative engagement with said buffering means of said trunk cable whereby said uncoiled, substantially linear length of said trunk cable extending through said cavity remains in a fixed position relative to said splice closure body.

11. A preterminated fiber optic cable assembly as described in claim 10, wherein said first and second clamping means are secured to said splice closure body at said first and second ends of said splice closure.

12. A preterminated fiber optic cable assembly as described in claim 9, wherein said trunk cable buffering means comprises a single buffer tube encompassing said optical fibers and further wherein said trunk cable further comprises at least one strength member extending longitudinally with said buffer tube.

13. A preterminated fiber optic cable assembly as described in claim 12, wherein said first and second clamping means each comprise first and second halves having means for being secured to said splice closure body and being dimensioned for cooperative engagement with said trunk cable strength member whereby said uncoiled, substantially linear length of said trunk cable extending through said cavity remains in a fixed position relative to said splice closure body.

14. A preterminated fiber optic cable assembly as described in claim 1, wherein a portion of said drop cable second fiber portion is encompassed by a transport tube.

15. A preterminated fiber optic cable assembly as described in claim 1, wherein said preterminated fiber optic cable assembly comprises a plurality of drop cables, each drop cable first end having a connector attached thereto.

16. A preterminated fiber optic cable assembly as described in claim 1, wherein said preterminated fiber optic cable assembly comprises a plurality of drop cables and means for strapping said plurality of drop cables to said trunk cable.

17. A preterminated fiber optic cable assembly as described in claim 1, wherein said preterminated fiber optic cable assembly further comprises means for covering said splice closure.

18. A preterminated fiber optic cable assembly as described in claim 17, wherein said covering means comprises a heat-recoverable wrap.

19. A preterminated fiber optic cable assembly as described in claim 18, wherein said covering means further comprises a non-adhesive wrap disposed between said splice closure and said heat-recoverable wrap.

20. A preterminated fiber optic cable assembly as described in claim 1, wherein said preterminated fiber optic cable assembly further comprises at least one conductor for electricity.

21. A preterminated fiber optic cable assembly as described in claim I, wherein said splicing optical fiber second portion is coiled within said splice closure cavity.

22. A preterminated fiber optic cable assembly as described in claim 1, wherein at least a portion of said drop cable second fiber portion is coiled within said splice closure cavity.

23. A preterminated fiber optic cable assembly as described in claim 22, wherein said splice closure is comprised of substantially symmetrical first and second halves, said splice closure first and second halves having means for being secured together, and further wherein said splice closure further comprises a retaining bracket extending into said splice closure cavity for retaining said drop cable optical fiber second portion in one of said splice closure halves.

24. A preterminated fiber optic cable assembly as described in claim 1, wherein said splice closure further comprises a splice holder in said splice closure cavity for holding said splice and preventing any splice movement.

25. A preterminated fiber optic cable assembly as described in claim 1, wherein said trunk cable further comprises a disconnect point disposed along the length of said trunk cable, said disconnect point being encapsulated by a heat-recoverable patch.

26. A splice closure for use with a preterminated fiber optic cable assembly comprising a trunk cable having a predetermined length and first and second ends, said trunk cable further having an access point being positioned along the length of said trunk cable, said trunk cable comprising optical fiber buffering means of said predetermined length and having first and second ends, at least one optical fiber of said predetermined length disposed within and enclosed by said buffering means, said optical fiber having first and second ends coincident with the first and second ends of said trunk cable, and at least one splicing optical fiber having first and second ends and having a first portion extending between the splicing optical fiber's first end being coincident with said trunk cable first end and said access point, said first portion being disposed within and enclosed by said buffering means, and a second portion extending between said access point and the splicing optical fiber's second end, said second portion being disposed outside of said buffering means, and at least one drop cable having first and second ends, said drop cable comprising jacketing means having first and second ends, said jacketing means first end being coincident with said drop cable first end, and at least one optical fiber having first and second ends coincident with said drop cable first and second ends, the drop cable optical fiber further having a first fiber portion extending between its first end and said jacketing means second end, said first fiber portion being disposed within and enclosed by said jacketing means, and a second fiber portion extending between said jacketing means second end and the second end of the drop cable optical fiber, said second fiber portion being disposed outside of said jacketing means, second end being spliced to said splicing optical fiber second end, said splice closure comprising:

a splice closure body having a cavity dimensioned for encompassing an uncoiled, substantially linear length of said trunk cable extending therethrough, said trunk cable length including at least said access point, and for further encompassing said splicing optical fiber second portion and said splice; and means extending into said cavity for receiving said drop cable second fiber portion.

27. A splice closure as described in claim 26, wherein said splice closure has a cylindrical shape having first and second ends, said first and second ends each comprising means for receiving said trunk cable whereby said uncoiled, substantially linear length of said trunk cable extends between said first and second end receiving means.

28. A splice closure as described in claim 27, wherein said cylindrical splice closure has an outer diameter of less than 4 inches.

29. A splice closure as described in claim 27, wherein said cylindrical splice closure has a length of less than 8 inches.

30. A splice closure as described in claim 27, wherein said drop cable receiving means comprises a plurality of drop cable entrance channels extending between said first and second ends of said cylindrical splice closure and said cavity.

31. A splice closure as described in claim 26, wherein said drop cable comprises at least one strength member and said splice closure comprises means for securing said strength member to said splice closure.

32. A splice closure as described in claim 26, wherein said drop cable comprises an armored jacket and said splice closure further comprises a grounding strap having first and second ends, said grounding strap first end being connected to said armored jacket and said grounding strap second end being connected to said splice closure body.

33. A splice closure as described in claim 27, wherein said splice closure further comprises first and second means located at said splice closure first and second ends for clamping said trunk cable to said splice closure.

34. A splice closure as described in claim 33, wherein said first and second clamping means each comprise first and second halves having means for being secured to said splice closure body and being dimensioned for cooperative engagement with said buffering means of said trunk cable whereby said uncoiled, substantially linear length of said trunk cable extending through said cavity will remain in a fixed position relative to said splice closure body.

35. A splice closure as described in claim 34, wherein said trunk cable is a loose tube design optical fiber cable and wherein said first and second clamping means halves are dimensioned for cooperative engagement with the buffer tubes of said loose tube design optical fiber trunk cable.

36. A splice closure as described in claim 34, wherein said trunk cable is a monotube design optical fiber cable having at least one strength member and wherein said first and second clamping means halves are dimensioned for cooperative engagement with said at least one strength member of said monotube design optical fiber trunk cable.

37. A splice closure as described in claim 26, wherein said splice closure is comprised of substantially symmetrical first and second halves, said first and second halves comprising means for being secured together, and further wherein said splice closure further comprises a retaining bracket extending into said splice closure cavity for retaining said drop cable second fiber portion in one of said halves.

38. A splice closure as described in claim 26, wherein said splice closure further comprises a splice holder in said splice closure cavity for holding said splice and preventing any splice movement.

39. A method of making a preterminated fiber optic cable assembly utilizing a trunk cable having a predetermined length and having first and second ends, said trunk cable further having an access point and a disconnect point each being positioned along the length of said trunk cable, said trunk cable comprising optical fiber buffering means of said predetermined length and having first and second ends, at least one optical fiber of said predetermined length disposed within and enclosed by said buffering means, said optical fiber having first and second ends coincident with the first and second ends of said trunk cable, and at least one splicing optical fiber having first and second ends and having a first portion extending between the fiber's first end being coincident with said trunk cable first end and said access point and a second portion extending between said access point and the fiber's second end being coincident with said disconnect point, said splicing optical fiber being disposed within and enclosed by said buffering means, at least one drop cable having first and second ends, said drop cable comprising jacketing means having first and second ends, said jacketing means first end being coincident with said drop cable first end, and at least one optical fiber having first and second ends coincident with said drop cable first and second ends and having a first fiber portion extending between said first end of the drop cable optical fiber and said jacketing means second end, said first fiber portion being disposed within and enclosed by said jacketing means, and a second fiber portion extending between said jacketing means second end and said second end of the drop cable optical fiber, said second fiber portion being disposed outside of said jacketing means, and a splice closure, comprising a splice closure body having a cavity dimensioned for encompassing an uncoiled, substantially linear length of said trunk cable extending therethrough, and means extending into said cavity for receiving said drop cable second fiber portion, said method comprising the steps of:

removing a portion of said buffering means at said access point of said trunk cable so that said splicing optical fiber is accessible;

removing said splicing optical fiber second portion from within said buffering means so that said splicing optical fiber second portion is disposed outside of said buffering means;

splicing said splicing optical fiber second end to said drop cable optical fiber second end; and enclosing said splice, said splicing optical fiber second portion, and said uncoiled, substantially linear length of said trunk cable with said splice closure, said trunk cable disconnect point being disposed outside of said splice closure.

40. A method of making a preterminated fiber optic cable assembly as described in claim 39, wherein said method further comprises the step of encapsulating said splice closure with a heat-recoverable wrap.

41. A method of making a preterminated fiber optic cable assembly as described in claim 39, wherein said method further comprises the steps of encapsulating said splice closure with a non-adhesive wrap and encapsulating said non-adhesive wrap with a heat-recoverable wrap.

42. A method of making a preterminated fiber optic cable assembly as described in claim 39, wherein said preterminated fiber optic cable assembly comprises a plurality of drop cables and said method further comprises the step of strapping said plurality of drop cables to said trunk cable.

43. A method of making a preterminated fiber optic cable assembly as described in claim 39, wherein said method further comprises the step of attaching a connector to said at least one drop cable first end.

44. A method of making a preterminated fiber optic cable assembly as described in claim 39, wherein said trunk cable buffering means comprises at least one buffer tube and said trunk cable further comprises an outer jacket encapsulating said buffer tube and further wherein said method further comprises, before said buffering means removing step, the step of removing the portion of said outer jacket along said uncoiled, substantially linear length of said trunk cable.

45. A method of making a preterminated fiber optic cable assembly as described in claim 44, wherein said trunk cable further comprises an armored jacket disposed between said outer jacket and said buffer tube and wherein said method further comprises, after said outer jacket removing step, the step of removing the portion of said armored jacket along said uncoiled, substantially linear length of said trunk cable.

46. A method of making a preterminated fiber optic cable assembly as described in claim 45, wherein said trunk cable further comprises an inner jacket disposed between said armored jacket and said buffer tube and further wherein said method further comprises, after said armored jacket removing step, the step of removing said inner jacket along said uncoiled, substantially linear length of said trunk cable.

47. A method of making a preterminated fiber optic cable assembly as described in claim 46, wherein said trunk cable further comprises radial strength yarns disposed between said inner jacket and said buffer tube and further wherein said method further comprises, after said inner jacket removing step, the step of removing said radial strength yarns along said uncoiled, substantially linear length of said trunk cable.

48. A method of making a preterminated fiber optic cable assembly as described in claim 45, wherein said method further comprises the step of connecting a grounding strap between said armored jacket and said splice closure body.

49. A method of making a preterminated fiber optic cable assembly as described in claim 39, wherein said method further comprises, after said splicing step, the step of clamping said trunk cable to said splice closure.

50. A method of making a preterminated fiber optic cable assembly as described in claim 39, wherein said splice closure further comprises a splice holder disposed in said splice closure cavity and further wherein said method further comprises, after said splicing step, the step of securing said splice to said splice holder.

51. A method of making a preterminated fiber optic cable assembly as described in claim 39, wherein said drop cable further comprises a strength member and said method further comprises the step of securing said strength member to said splice closure.

52. A method of making a preterminated fiber optic cable assembly as described in claim 39, wherein said method further comprises, before said splicing step, the step of applying transport tubing to said drop cable second fiber portion.

53. A method of making a preterminated fiber optic cable assembly utilizing a trunk cable having a predetermined length and having first and second ends, said trunk cable further having an access point and a disconnect point each being positioned along the length of said trunk cable, said trunk cable comprising optical fiber buffering means of said predetermined length and having first and second ends and a plurality of optical fibers of said predetermined length disposed within and enclosed by said buffering means, said optical fibers having first and second ends coincident with the first and second ends of said trunk cable, at least one drop cable having first and second ends, said drop cable comprising jacketing means having first and second ends, said jacketing means first end being coincident with said drop cable first end, and at least one optical fiber having first and ends coincident with said drop cable first and second ends and having a first fiber portion extending between said drop cable optical fiber's first end and said jacketing means second end, said first fiber portion being disposed within and enclosed by said jacketing means, and a second fiber portion extending between said jacketing means second end and said drop cable optical fiber's second end, said second fiber portion being disposed outside of said jacketing means, and a splice closure comprising a splice closure body having a cavity dimensioned for encompassing an uncoiled, substantially linear length of said trunk cable extending therethrough, and means extending into said cavity for receiving said drop cable second fiber portion, said method comprising the steps of:
 removing a portion of said buffering means at said disconnect point of said trunk cable so that at least one optical fiber is accessible;
 cutting said at least one optical fiber at said disconnect point;
 encapsulating said disconnect point with a heat-recoverable patch;
 removing a portion of said buffering means at said access point of said trunk cable so that said at least one optical fiber is accessible;
 removing from within said buffering means the portion of said at least one optical fiber extending between said access point and said disconnect point so that said portion is disposed outside of said buffering means and has an end disposed outside of said buffering means;
 splicing said end of said portion of said at least one optical fiber to said drop cable optical fiber second end; and
 enclosing said splice, said portion of said at least one optical fiber, and said uncoiled, substantially linear length with said splice closure, said trunk cable disconnect point being disposed outside of said splice closure.

54. A splice closure for use with a preterminated fiber optic cable assembly, said splice closure comprising:
 a splice closure body having a cavity dimensioned for encompassing an uncoiled, substantially linear length of a trunk cable extending therethrough, said trunk cable having a plurality of optical fibers, and further for encompassing an optical fiber splice;
 means for receiving said uncoiled, substantially linear length of said trunk cable;
 means extending into said cavity for receiving an optical fiber from a drop cable;

means for securing a strength member of said drop cable to said splice closure body;

means for connecting an armored jacket of said trunk cable to said splice closure body; and clamping means for securing said uncoiled, substantially linear length of said trunk cable to splice closure.

55. A splice closure as described in claim 54, wherein said splice closure has a cylindrical shape having first and second ends, and further wherein said trunk cable receiving means comprises first and second trunk cable receiving means disposed at said splice closure first and second ends, whereby said uncoiled, substantially linear length of said trunk cable extends between said splice closure first and second receiving means.

56. A splice closure as described in claim 55, wherein said cylindrical splice closure has an outer diameter of less than four inches.

57. A splice closure as described in claim 55, wherein said cylindrical splice closure has a length of less than eight inches.

58. A splice closure as described in claim 55, wherein said drop cable optical fiber receiving means comprises a plurality of drop cable entrance channels extending between said first and second ends of said cylindrical splice closure and said cavity.

59. A splice closure as described in claim 54, wherein said splice closure further comprises means for electrically connecting said armored jacket of said trunk cable to said splice closure body.

60. A splice closure as described in claim 54, wherein said first and second clamping means each comprise first and second halves having means for being secured to said splice closure body and being dimensioned for cooperative engagement with said uncoiled, substantially linear length of said trunk cable.

61. A splice closure as described in claim 54, wherein said splice closure body is comprised of substantially symmetrical first and second halves, said splice closure first and second halves having means for being secured together.

62. A splice closure as described in claim 61, wherein said splice closure further comprises a retaining bracket extending into said cavity for retaining said drop cable optical fiber in one of said halves.

63. A splice closure as described in claim 54, wherein said said splice closure further comprises a splice holder in said cavity for holding said splice and preventing any splice movement.

64. A preterminated fiber optic cable assembly comprising:

a slotted core trunk cable having a predetermined length and having first and second ends, said trunk cable further having an access point being positioned along the length of said trunk cable, said trunk cable including; a longitudinally extending central strength member having at least one groove extending therealong and having a length substantially equal to said predetermined length and having first and second ends, at least one optical fiber of substantially said predetermined length disposed within said groove, said fiber having first and second ends substantially coincident with the first and second ends of said trunk cable, and at least one splicing optical fiber having first and second ends in a first portion extending between its first end being coincident with said trunk cable first end and said access point, said first portion being disposed within said groove and a second portion extending from said access point to its second end, said second portion being disposed outside of said groove;

at least one drop cable having first and second ends, said drop cable including; jacketing means having first and second ends, said jacketing means first end being substantially coincident with said drop cable first end, and at least one optical fiber having first and second ends substantially coincident with said drop cable first and second ends, said fiber having a first fiber portion extending between its first end and said second end of said jacketing means, said first fiber portion being disposed within and enclosed by said jacketing means, and a second fiber portion extending between said jacketing means second end and the fiber's second end, said second fiber portion being disposed outside of said jacketing means, the fiber's second end being spliced to said splicing optical fiber second end; and a splice closure including; a splice closure body having a cavity dimensioned for encompassing an uncoiled, substantially linear length of said trunk cable extending therethrough, said trunk cable length including at least said access point and for further encompassing said splicing optical fiber second portion and said splice, and opening means extending into said cavity for receiving said drop cable second fiber portion.

65. A method of making a preterminated fiber optic cable assembly utilizing a slotted core trunk cable having a predetermined length and having first and second ends, said trunk cable further having an access point and a disconnect point each being positioned along the length of said trunk cable, said trunk cable comprising outer jacketing means of said predetermined length and having first and second ends and a plurality of optical fibers of said predetermined length disposed within and enclosed by said outer jacketing means, said optical fibers having first and second ends coincident with the first and second ends of said trunk cable, at least one drop cable having first and second ends, said drop cable comprising jacketing means having first and second ends, said jacketing means first end being coincident with said drop cable first end, and at least one optical fiber having first and ends coincident with said drop cable first and second ends and having a first fiber portion extending between said drop cable optical fiber's first end and said jacketing means second end, said first fiber portion being disposed within and enclosed by said jacketing means, and a second fiber portion extending between said jacketing means second end and said drop cable optical fiber's second end, said second fiber portion being disposed outside of said jacketing means, and a splice closure comprising a splice closure body having a cavity dimensioned for encompassing an uncoiled, substantially linear length of said trunk cable extending therethrough, and means extending into said cavity for receiving said drop cable second fiber portion, said method comprising the steps of:

removing a portion of said outer jacketing means at said disconnect point of said trunk cable so that at least one optical fiber is accessible;

cutting said at least one optical fiber at said disconnect point;

encapsulating said disconnect point with a heat-recoverable patch;

removing a portion of said outer jacketing means at said access point of said trunk cable so that said at least one optical fiber is accessible;

removing from within said outer jacketing means the portion of said at least one optical fiber extending between said access point and said disconnect point so that said portion is disposed outside of said outer jacketing means and has an end disposed outside of said outer jacketing means;

splicing said end of said portion of said at least one optical fiber to said drop cable optical fiber second end; and enclosing said splice, said portion of said at least one optical fiber, and said uncoiled, substantially linear length with said splice closure, said trunk cable disconnect point being disposed outside of said splice closure.

66. A splice closure for use with a preterminated fiber optic cable assembly, said splice closure comprising:

a splice closure body having a cavity dimension for encompassing an uncoiled, substantially linear length of a trunk cable extending therethrough and for encompassing at least one optical fiber splice;

means for receiving said uncoiled, substantially linear length of said trunk cable; and means extending into said cavity for receiving an optical fiber form a drop cable.

* * * * *